United States Patent [19]
Zwirn et al.

[11] 4,424,943
[45] Jan. 10, 1984

[54] TRACKING SYSTEM

[75] Inventors: Robert Zwirn; John W. Bozeman, both of Los Angeles, Calif.

[73] Assignee: Hughes Aircraft Company, El Segundo, Calif.

[21] Appl. No.: 259,865

[22] Filed: May 4, 1981

[51] Int. Cl.³ ............................................. F41G 7/30
[52] U.S. Cl. ................................................ 244/3.11
[58] Field of Search .................... 244/3.11, 3.12, 3.13, 244/3.14

[56] References Cited

U.S. PATENT DOCUMENTS

| | | | |
|---|---|---|---|
| 2,930,894 | 3/1960 | Bozeman | 244/3.11 |
| 3,098,933 | 7/1963 | Barasch | 244/3.14 |
| 3,598,344 | 8/1971 | Walters et al. | 244/3.11 |
| 3,711,046 | 1/1973 | Barhydt et al. | 244/3.12 |
| 3,751,166 | 8/1973 | Starkey et al. | 244/3.16 |
| 3,761,180 | 9/1973 | Maxwell, Jr. et al. | 244/3.13 |
| 3,820,742 | 6/1974 | Watkins | 244/3.11 |
| 3,848,830 | 11/1974 | Born | 244/3.16 |
| 3,954,228 | 5/1976 | Davis, Jr. | 244/3.16 |
| 3,998,406 | 12/1976 | Smith et al. | 244/3.11 |
| 4,027,837 | 6/1977 | Miller, Jr. et al. | 244/3.11 |
| 4,047,117 | 9/1977 | Tuchyner et al. | 244/3.16 |
| 4,047,678 | 9/1977 | Miller, Jr. et al. | 244/3.16 |
| 4,162,052 | 7/1979 | Lamelot | 244/3.16 |
| 4,174,818 | 11/1979 | Glenn | 244/3.13 |
| 4,220,296 | 9/1980 | Hesse | 244/3.14 |

*Primary Examiner*—Charles T. Jordan
*Attorney, Agent, or Firm*—W. J. Benman, Jr.; W. J. Bethurum; A. W. Karambelas

[57] ABSTRACT

An improved line-of-sight commanded missile guidance system is provided which provides the operator of a missile system with the capability of hitting targets which would otherwise be obscured by darkness, smoke, aerosols or poor atmospheric visibility.

The system includes a tracker equipped with an infrared sensor and means for periodically blinking a laser beacon which is mounted on the missile. The laser operates in a range in which it would be most visible under the above described atmospheric conditions. Blinking provides countermeasure resistance. The sensor provides electrical signals representing frames of data corresponding to the target scene. Alternate frames contain the beacon signature. Electronic circuitry is provided for subtracting successive frames to eliminate clutter and to then provide signals indicative of the position of the missile relative to the center of the field of view.

2 Claims, 17 Drawing Figures

TRACKING SYSTEM

BACKGROUND OF THE INVENTION

1. Field of the Invention

This invention relates to missile tracking systems. More specifically, this invention relates to improvements in the tracking and guidance of line-of-sight command missiles.

While the present invention is described herein with reference to particular embodiments, it is to be understood that the invention is not limited thereto. Modifications may be made within the teachings of this invention without departing from the true spirit and scope thereof.

2. Description of the Prior Art

A typical line-of-sight guided missile system includes a launcher and guided missile. In some systems, the launcher is equipped with a gunners optical sight and an electronic guidance computer which automatically sends steering commands to the missile in flight. In such systems, after launch, a beacon in the tail of the missile may be activated and subsequently detected by a sensor on the launcher. The sensor would be boresighted with the gunners telescope and would allow the launcher to track the missile along its flight path. The sensor and associated processing circuitry would measure the angle between the missile and the gunners line-of-sight. These displacements would be transformed by the computer into guidance commands which would be sent to the missile. The gunner used only keep the crosshairs of the telescope on the target during missile flight.

This system would be and is effective under all conditions in which the target is visible to the gunner. Accordingly, its operability is limited as to targets which are obscured by darkness, smoke, or under conditions of poor atmospheric visibility. When the system is augmented by a foward looking infrared (FLIR) sensor and display, the operator has the capability of seeing many targets which would otherwise be obscured.

SUMMARY OF THE INVENTION

The present invention provides means for improving the performance of the FLIR augmented line-of-sight commanded missile systems.

The system of the present invention provides for periodic operation of the missile beacon in synch with the scanning rate of the infrared sensor and display. The sensor provides electrical signals representing frames of data corresponding to the target scene. Alternate frames contain the beacon signature. Electronic circuitry is provided for subtracting successive frames to eliminate clutter, accentuate the beacon and provide signals indicative of the position of the missile. In a specific embodiment, the invention contemplates the use of a laser as a beacon for increased range and visibility under adverse conditions.

BRIEF DESCRIPTION OF THE DRAWINGS

FIG. 6b is a graph of the output of the detector of the azimuth position pickoff mechanism of FIG. 6a.

FIG. 7b is an enlarged view of the scene of FIG. 7a.

FIG. 9a shows the gated output of video channel 16 in successive frames.

FIG. 9b shows the effect of subtracting the second frame of video output from channel 16 as shown in FIG. 9a from the first frame of video output from channel 16 as shown in FIG. 9a.

FIG. 9c is illustrative of how the data of FIG. 9b may be represented and stored in shift registers.

DESCRIPTION OF THE INVENTION

Figure 1:
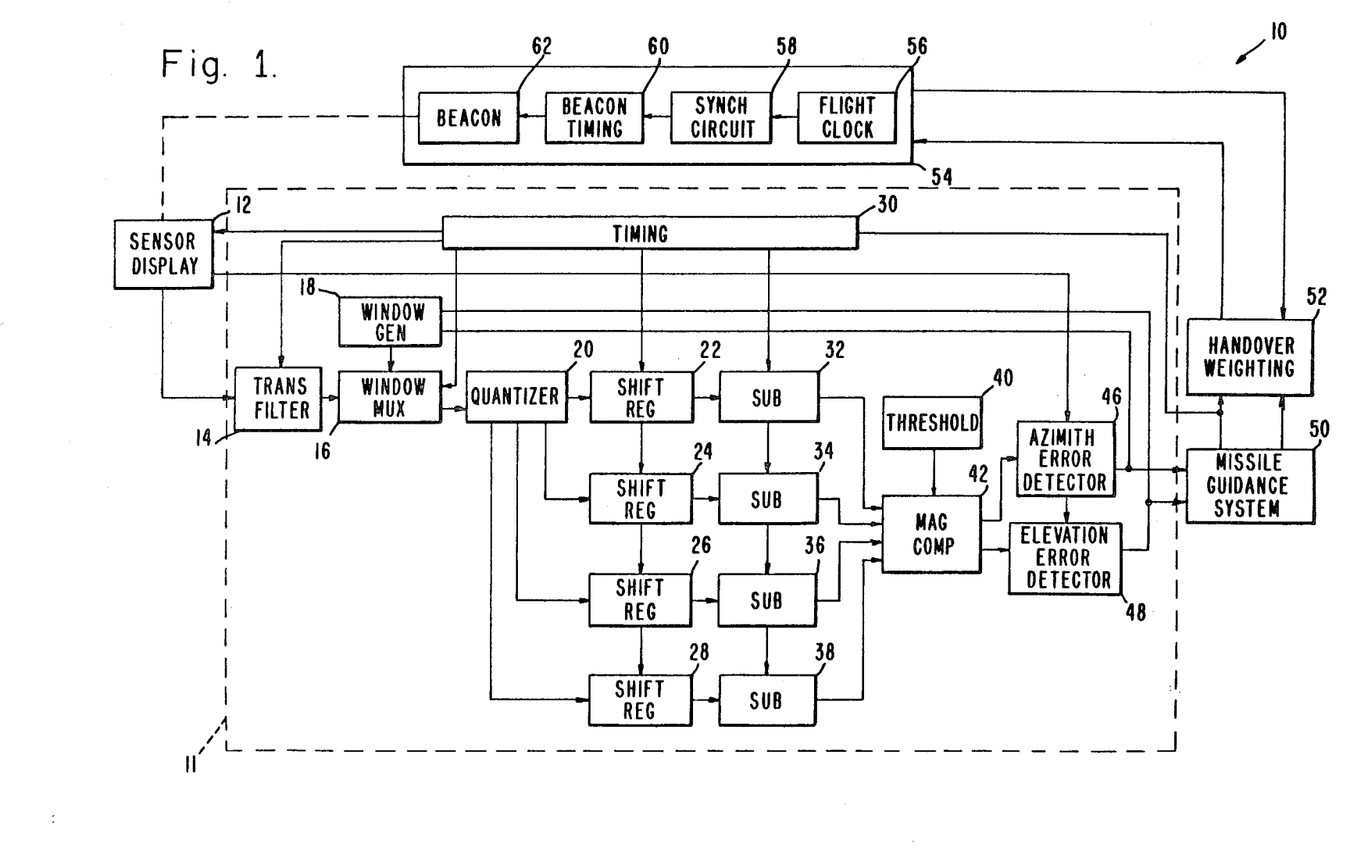
FIG. 1 is a block diagram representation of a preferred embodiment of the present invention.

FIG. 1 shows the improved tracking system 10 of the present invention. It includes an infrared sensor and display shown generally at 12. The sensor/display 12 is of the AN/TAS-4 variety modified to provide successive frames of electrical video signals as well as an optical image. One frame of data corresponds to the scene when a beacon located on the missile is on and the next frame corresponds to the scene when the beacon is off.

Figure 2:
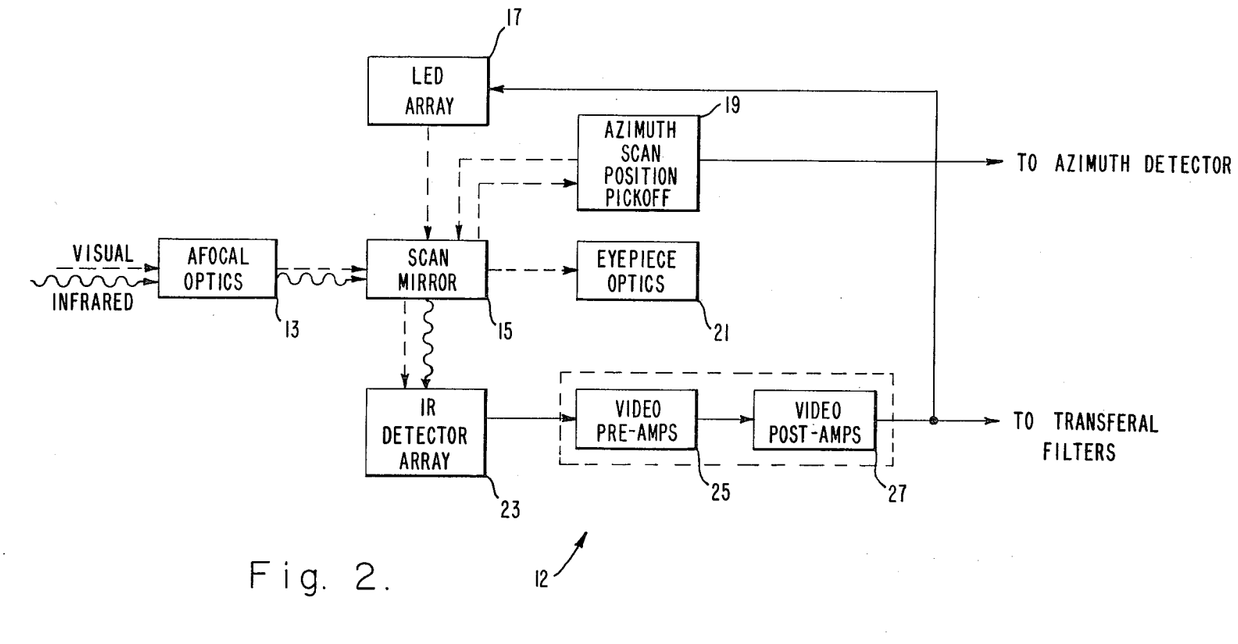
FIG. 2 is a block diagram representation of the sensor/display utilized in the present invention.

The sensor/display 12 is shown in greater detail in FIG. 2. It is divided into eight distinct functional groups including afocal input optics 13, a mechanical scanner with driver 15, an LED array or display 17, an azimuth scan position pickoff circuit 19, eye piece optics 21, detector array 23 and video electronics including preamps 25 and postamps 27. Not shown in either FIG. 1 or FIG. 2 is a power supply or battery, nonetheless it is comtemplated that one of ordinary skill in the art would utilize some form of power supply in order to practice this invention.

The spectral characteristics of the afocal optical coating at 13 effectively limits the input optical energy to the desired region. In the preferred embodiment the desired region is 8 to 12 microns. As a result, the infrared sensor/display 12 of the present invention processes thermally-radiated energy from terrestrial and man made objects as well as the energy radiated from the missile beacon which in the preferred embodiment also radiates in 8 to 12 micron region for improved aerosol and smoke penetration performance.

Figure 3A:
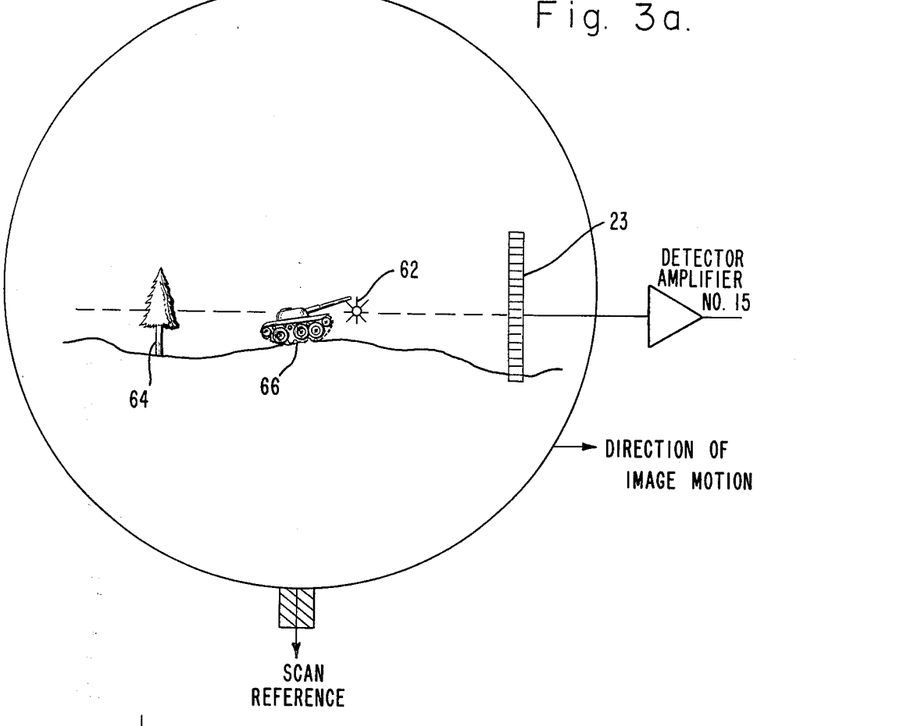
FIG. 3a is a representation of a typical visual scene.
Figure 3B:
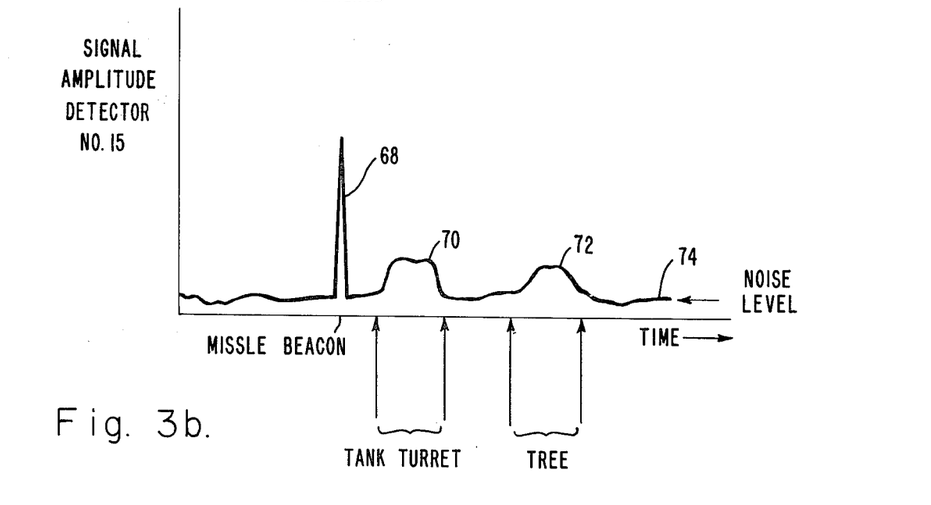
FIG. 3b is a typical time history of one detector.

As shown in FIG. 2, the afocal optics 13 receives infrared and visible energy. The input energy is mechanically scanned across the stationary detector array 23 such that the detectors are "painted" by the imaged energy. A typical scene image is depicted in FIG. 3a. The scene includes a tree 64, a tank target 66, and the aft end of a missile looking at the laser beacon 62. The stationary detector array is represented at 23. As the scenes moves from left to right the time history of a single detector would be as represented in FIG. 3b. The spike at 68 would be representative of the missile beacon 62. The tank turret and the tree would be represented at 70 and 72 respectively. Note the ambient background level 74.

Each detector output is processed by a separate channel of preamplification and postamplification circuitry 25 and 27 located in the video electronics block.

From the video electronics, the channels of video pass into the video tracker 11 and are filtered. Assuming a missile has not been launched, the same input video information is transmitted without change in the LED array 17 of FIG. 2. The LED array 17 has one LED corresponding to each detector element.

Generation of the rectangular display by the array 17 is accomplished in conjugate to the scene image scanned across the detector array 23. The scan mirror 15 serves doubly in acting as a scan mirror for input energy, as well as being the scan mirror for the visible LED output energy. In the preferred embodiment, the scan mirror is a plane parallel mirror having scan angles identical in magnitude for both input and LED energy. Thus a one-to-one correspondence exists between respective angular positions of the two sides of the scan mirror.

Figure 4:
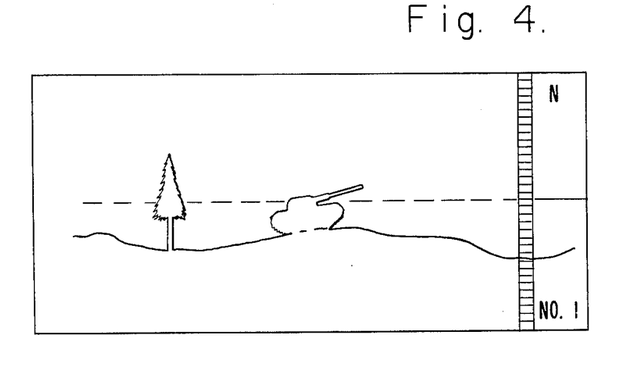
FIG. 4 is representative of the display of the typical visual scene.
Figure 5:
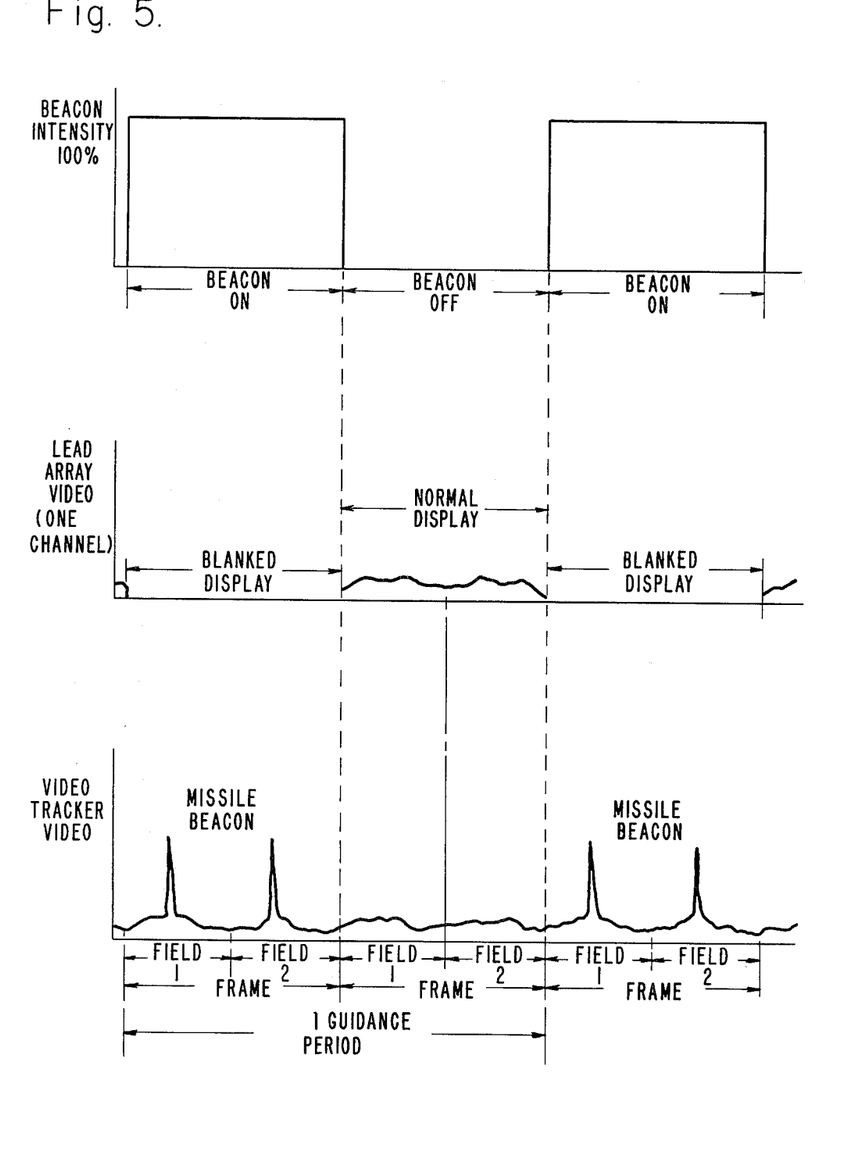
FIG. 5 is an LED array video time history.

The image of the LED array 17, is shown in FIG. 4. The LED array 17 effectively recreates the scene detected by the detector array 23. A time history of one channel of the LED array 17 video is shown in FIG. 5, together with the video used by the video tracker and the phase-locked beacon modulation. As illustrated, the display is electronically blanked during the beacon on frame. Note that the interlace scan results in two fields for each frame and that two frames are contained in one guidance period.

Figure 6A:
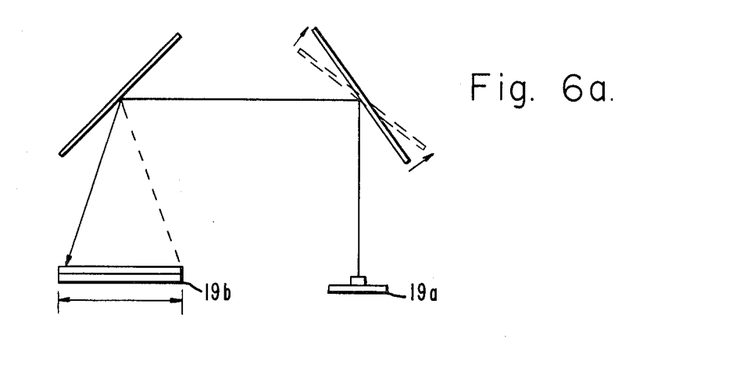
FIG. 6a is a diagrammatic representation of the azimuth position pickoff scheme of the present invention.
Figure 6B:
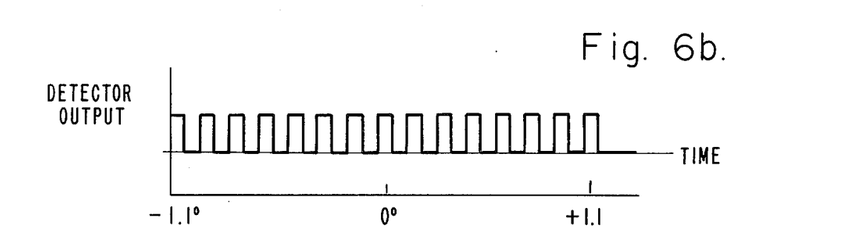
Figure 6C:
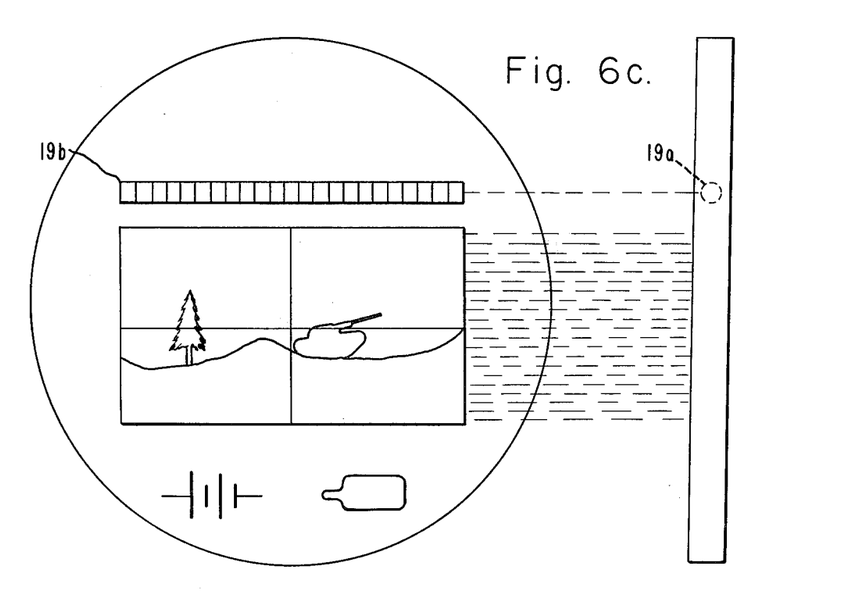
FIG. 6c is an illustrative view of the location of the azimuth position pickoff scheme relative to the display.

The azimuth position pickoff 19 generates precise azimuth location information relative to the line-of-sight crosshairs in the display for determining missile position in reference to the gunner's crosshairs. As shown in FIG. 6, the azimuth position pickoff 19 consists of a diode emitter with focusing optics 19a, and a detector 19b equipped with a picket fence type reticle. The emitter 19a is physically placed colinearly in close proximity to the LED array 17. The detector 19b is placed just behind the reticle assembly but above the operator's elevation field of view. The detector output is a pulse train and covers an angular subtense equal to the field of view of the infrared sensor 12. The picket fence reticle is registered at the time of assembly with the vertical crosshair such that the pulse train is symetrically oriented with respect to the vertical crosshair. This establishes a precise azimuth reference in which the video tracker can determine the missile position error relative to the vertical crosshair.

Returning now to FIG. 1, the video tracker receives display video and azimuth position data from the infrared sensor 12, and missile identification logic (new or old) from the loaded round. (The new versus old distinction will be apparent from the following discussion.)

If the loaded round is of the old configuration, the video tracker inhibits further processing and the firing proceeds in a conventional manner during which the gunner can steer through either the telescope or the LED array 17.

If the loaded round is a new missile, the video tracker enables all processing circuitry and prepares to accept the infrared sensor display video. The frequency of the infrared sensor scan mirror 15 is determined from the azimuth pickoff and a synchronization signal is sent by the timing circuit to the beacon 62. This initializes phase lock of the beacon modulation to exactly one-half the scan mirror frequency for the missile beacon blanking in the display 12 so that the gunner is not distracted by the beacon. At the time of launch, the missile guidance system 50 sends a signal (T=0) to the video tracker, which corresponds to simulated first motion of the missile. This T=0 signal initializes the timing circuit 30 in the video tracker and starts the processing scheme. Display video is examined by the tracker 11 for evidence of the beacon and the alternate frame display blanking is initiated. As the missile 54 enters the infrared sensor 12 narrow field of view, the missile beacon 62 will appear as a very strong signal in the video relative to all other video information and as such as immediately recognized by the tracker electronics. Azimuth and elevation error signals are generated, scaled, and made available for guidance of the missile in the manner described below.

Figure 7A:
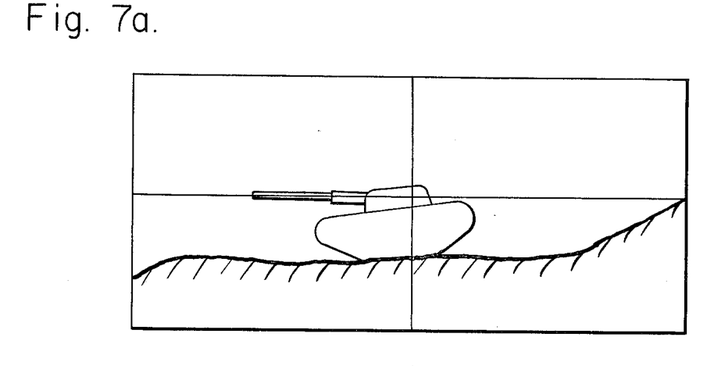
FIG. 7a is another typical scene.
Figure 7B:
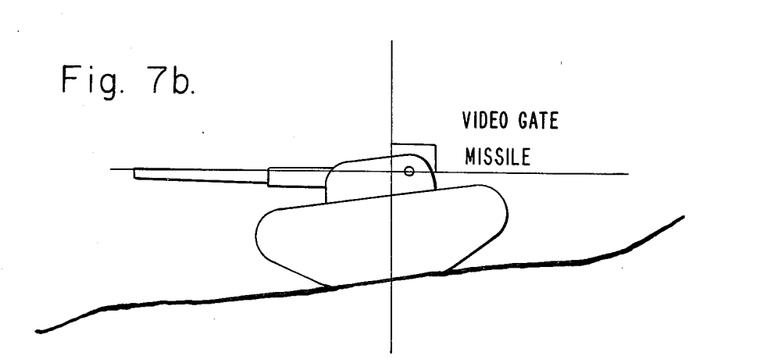
Figure 7C:
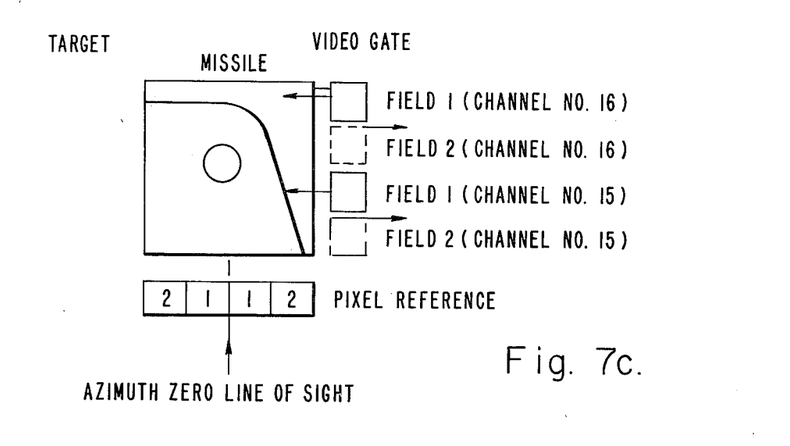
FIG. 7c is an enlarged view of a portion of FIG. 7b.

After buffering, each channel of video drives into a matched filter which could be implemented as a charged coupled device (CCD) transversal filter 14. The transversal filters 14 eliminate some clutter by surpressing images larger than the beacon. The output of the transversal filters provides an input to a window multiplexing unit 16. The window multiplexing unit 16 acts as a video gate to limit further processing to video in the vicinity of the missile beacon. This is illustrated in FIG. 7. FIG. 7a shows the tracker field of view. FIG. 7b is an enlargement of that portion of FIG. 7a near the center of the field of view. It reveals the video gate, the tank target and the missile beacon. (The missile beacon and the video gate do not appear in the display). FIG. 7c is a further enlargement of the video gate. It shows the target clutter as a shaded area. A horizontal pixel reference, and the interlace relationship of two detector elements which provide two fields of data for two channels of video output. Thus the window is equivalent to four detectors high by four pixels wide.

Figure 8A:
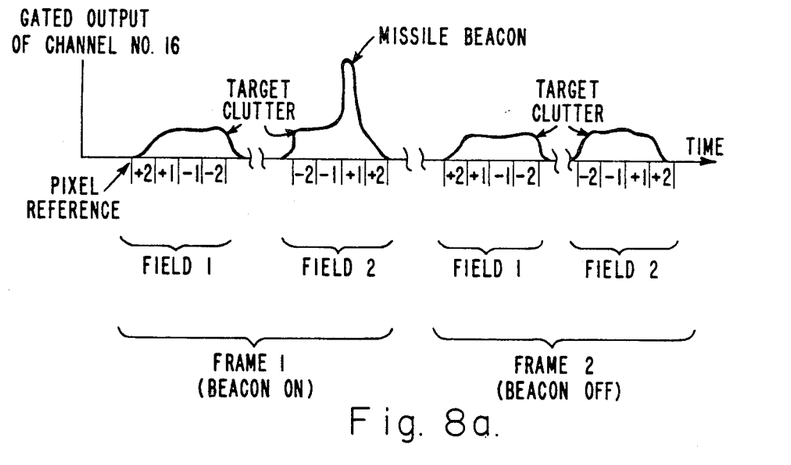
FIG. 8a shows the gated output of video channel 16.
Figure 8B:
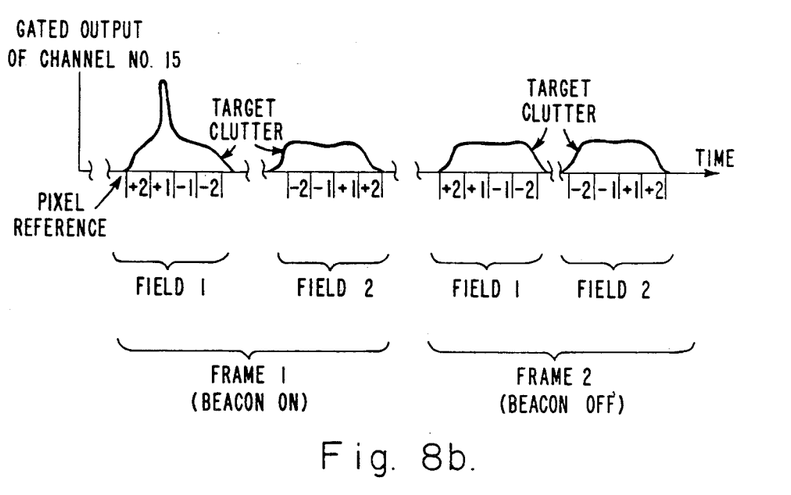
FIG. 8b shows the gated output of video channel 16.

For a single frame of data, a single detector provides a field of data for a forward scan of the mirror 15 and a second field of data for the reverse or interlace scan. FIGS. 8a and 8b illustrate the gated outputs of channels 15 and 16 with reference the window of FIG. 7c. FIG. 8 thus shows the electrical analog of the image contained within the video gate. It should be noted that these outputs are functions of time, but are discontinuous to show the relative change from frame-to-frame on a linear time-base scale. Starting with channel 16, field 1, and moving from right to left across the video gate pixel +2 shows an increase in amplitude, which is maintained in pixels +1, −1, and −2. Sweeping in the reverse direction (frame 2 goes from left to right, or equivalently from pixel −2 to pixel +2) channel 16 output increases rapidly because of the immediate presence of target clutter in pixel −2, and remains at that level until pixel +1 which contains the missile beacon. Since the beacon is a more intense source of radiation than the target clutter, its signal strength is much greater, thus a high amplitude on pixel +1. The amplitude of channel 16, field 2, decreases rapidly in pixel +2 because the target clutter has ended just after pixel +1. The same outputs have been generated for the next frame (frame 2) for the beacon-off case. Likewise, the output for channel 15 was generated in a similar manner. The window multiplexing unit 16 includes a position memory and adders and subtractors not shown which receive input from position detecting circuits 30 and 32 to set the video gate.

Figures 9A, 9B, 9C:
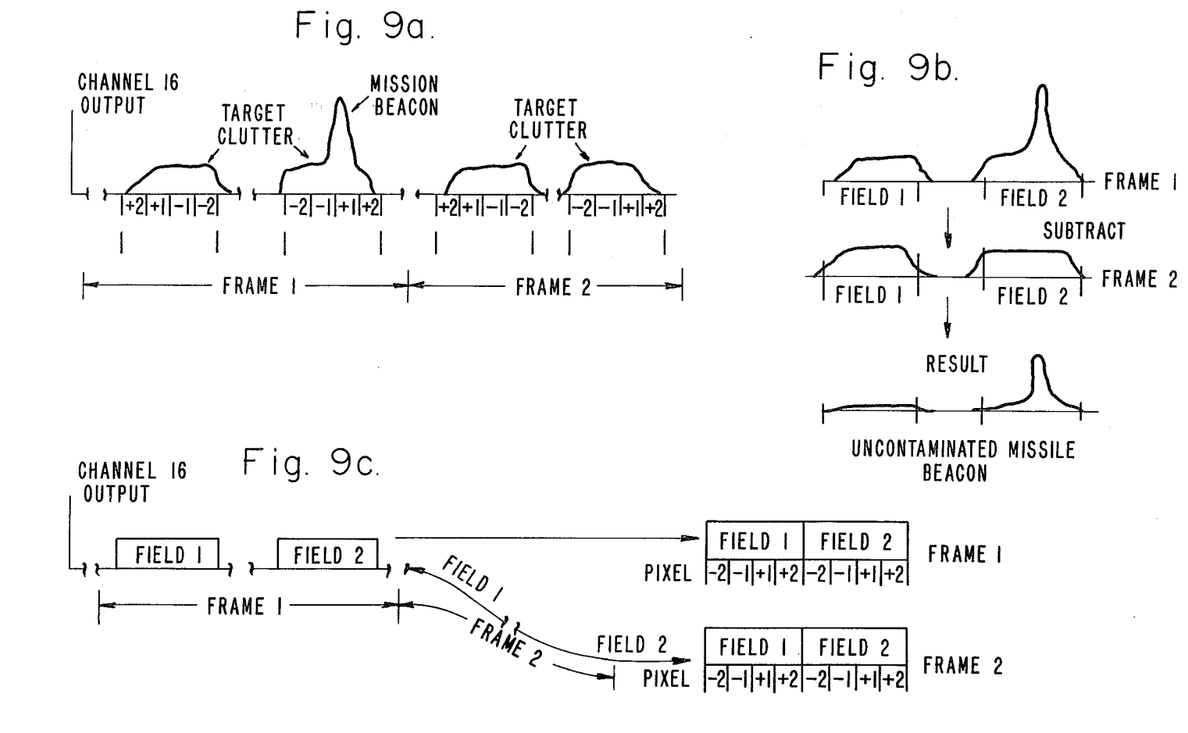

Video signals within the variable size window or gate, are passed from the multiplexer 16 to quantizer 20. Quantizer 20 functions as an A to D converter and transforms analog video signals from the multiplexer 16 to digital signals for input to shift registers. Shift registers 22, 24, 26, and 28 operate under control of a timing circuit 30 to store successive frames of video data. Individual frames of video are separated and loaded into different shift registers but remain coincident in pixel position. Serialized data enters shift registers until full. As data enters the subtractors, it is subtracted from data in the shift registers. The subtractors perform a repeated subtraction at the pixel rate to find the best minima or match. (The "pixel" rate is the rate at which individual picture elements are loaded into the shift register.) While this best match is taking place, the pixel of the frame in which the beacon is present would be represented by a large digital number relative to the small numbers which represent residual clutter in the other pixels. Since the beacon is on for one complete frame and off for one, the main effect of subtracting frames is to accentuate the beacon and reduce the clutter to a small residue. A decoy beacon which is not in phase with the sensor 12 would be subtracted from itself, thus causing no problems. As mentioned above, the display 17 is blanked during beacon on flames to minimize operator distraction. FIG. 9 duplicates the channel 16 output and shows how frame-to-frame subtraction yields the uncontaminated beacon from video containing target control clutter plus beacon.

In effect, the tracker 11 compensates for clutter motion within the video gate by defining a two-dimensional zone within the video gate, hereinafter called the template domain, which contains the beacon plus a small amount of clutter. Also defined, is a larger two-dimensional zone, hereinafter called the search domain, which is comprised of the entire video gated information. Thus, the template domain is contained within the search domain.

When the clutter moves with respect to its previous location caused for example by target motion or gunner jitter, a best match from frame-to-frame may not be aligned in exact pixel coincidence. The best match is therefore achieved by moving the template domain information within the search domain information until a best match is obtained. This movement of the template is accomplished by initiating the subtraction scheme as certain pixels of the second frame of data are being stored.

When the beacon again predominates over the residual signals within the video gate, the magnitude comparator 42 performs a centroid comparison of the beacon data to determine where in time the peak of the beacon occurred. This point triggers a logic signal in the azimuth error detector 46 which is used to interrogate the azimuth position circuit 19 for azimuth location.

The azimuth error detector 46 generates a DC signal which corresponds to the azimuth position of the missile 54 relative to the gunners crosshairs. This is accomplished typically by utilizing a shift register (not shown) which counts the pulses from the azimuth scan position pickoff 19 and feeds the result into a digital-to-analog converter (also not shown). The result is a time-generated ramp voltage corresponding to the azimuth position of the scan mirror 15. Since the azimuth position pickoff 19 is set to be symmetrical about the crosshair reticle, a predetermined count relates to zero azimuth error, and hence zero volts out of the digital to analog converter. For example, if the beacon is detected by the left of the zero line of sight, the output is positive and similarly if the beacon is to the right the output is negative.

The elevation position is determined by assigning each of the detector channels an address which corresponds to the elevation angle in object space. Thus, for example, channel 1 may be below the zero line of sight and channel fifty above the zero line of sight. For early missile capture requirements, the tracker zero is permanently shifted downward to provide additional field of view above the zero line of sight. As a result, channel 15 may correspond, for example, to zero elevation error. The beacon tracker tells the elevation error detector 48 which channel or channels contain the beacon and a weighted value is assigned to that data. For example, channel 0 to 14 may be positive, with channels 16 to n being negative and channel 15 being zero.

The outputs of the error detectors 46 and 48 provide inputs to the missile guidance system computer 50 which then generates guidance command signals based upon the error signals to correct the missile line of flight. These commands are then transmitted to the missile via the handover weighting circuit 52 in a conventional manner.

The shift registers 22, 24, 26, and 28, subtractors 32, 34, 36, and 38, comparator 42 and detectors 46 and 48 provide means for taking the difference between successive frames of video data to ultimately provide signals indicative of the position of the missile 54.

A beacon 62 mounted on the missile 54 is effective at some portion of the missile flight to provide inputs to the scanner/display 12. In the preferred embodiment the beacon 62 is a laser, operational in the 8 to 12 micron range. The operation of the beacon is intermittent and under control of a beacon timing circuit 60 which has a synchronization determined by a synch circuit and a flight clock 58 and 56 respectively. The operation of the beacon is synchronized to the scanner 12 by timing circuit 30. It provides a beacon synch signal to the beacon timing circuit 60. For low clutter scenes, the beacon need not be intermittent and no frame-to-frame subtraction is needed. In this case missile guidance command can be issued every frame instead of every other frame, thus doubling the command rate.

The timing circuit 30, the beacon 62 and the beacon azimuth error detector 46, elevation error detector 48, missile guidance system 50, handover weighting 52, flight clock 56, synch circuit 58, and beacon timing 60 comprise means for providing radiant energy from the missile 54 to the sensor 12 during predetermined intervals of time.

In the operation of a typical line-of-sight guided missile the gunner acquires a target using an optical sight, and when the target is within range, fires a missile. As the missile leaves, a beacon on the aft end of the missile is tracked by an infrared sensor. The input to the infrared sensor is converted by detectors into electrical pulses. The pulses are applied to error detecting circuits, where the pulses are compared with a reference count. The output of each of the error detectors is applied to its respective command signal generator and represents the error angle between the system line-of-sight to the missile and the line-of-sight to the target.

As the gunner follows the target in azimuth and elevation, a transversing unit generates voltage porportional to the rates of motion. The azimuth rate voltage is combined in a yaw command signal generator with the yaw error signal from a yaw error detector card. Similarly, the elevation rate voltage is combined in a pitch command signal generator card with the pitch error signal from a pitch error detector card. The pitch command signal generator card output is applied to the yaw command signal generator card. The output of the yaw command signal generator card is a frequency multiplexed signal containing both pitch and yaw steering information and is supplied directly to the missile through the wire link.

The improved tracking mode of the present invention is identical to the mode previously described, however, in the mode of the present invention, the tracker 11 is tracking the synchronized beacon 62 and not the beacon associated with conventional line-of-sight missiles. As mentioned above, the import of this difference is that the synchronized beacon which operates in the 8 to 12 micron range is visible through darkness, smoke, haze and poor atmospheric visibility; whereas, the prior art beacon which normally operated in the shorter wavelength region is often severely attentuated under these conditions. In the improved tracking mode of the present invention, the time between trigger and fire is used by the tracker 11 to synchronize the modulation of the laser beacon 62 to the scaning mirror 15. Also, during this time period, the tracker 11 interrogates the missile to determine whether a conventional round is loaded or the dual mode round is loaded and selects the appropriate track line. That is, if an old round is loaded, the frame-to-frame subtraction technique of the present invention is by-passed and guidance signals are passed through the hand-over weighting circuit 52 on to the missile 54. Accordingly, if a dual mode round is loaded, the frame-to-fraime subtraction technique of the tracker 11 as described above is implemented.

In this event, the tracker 11 takes the video imagery from the sensor 12 and uses it to determine the location of the synchronized beacon 62 in the manner described above. The video tracker 11 subsequently determines the missile beacon position with respect to the gunner's crosshair reticle and provides azimuth and elevation missile guidance commands to the missile 54. These commands are automatically substituted for the present missile tracker guidance commands at the predetermined time during the missile capture phase. Thus the initial capture of the missile is accomplished using the conventional wide field of view tracker, for initial portions of the flight where visibility is typically adequate. Guidance is then transferred to the FLIR tracker before the predicted worse case smoke attenuation.

While the present invention has been described herein with reference to a particular embodiment, it is understood that the invention is not limited thereto. The teachings of this invention may be utilized by one having ordinary skill in the art to make modifications within the scope thereof. For example, frame-to-frame subtraction may be effectuated with analog as well as digital circuitry. Further, the missile guidance system of the present invention may be modified to operate in one or more in flight missile blinking modes without departing from the teachings of the disclosure. It is therefore contemplated by the appended claims to cover any and all such modifications.

What is claimed is:

1. A control system including a tracking unit for providing electrical signals indicative of the position of a vehicle relative to a predetermined frame of reference within a scene comprising:

means for providing radiant energy between said vehicle and the tracking unit during predetermined intervals of time, for indicating the position of said vehicle relative to the scene;

means for providing electrical signals representing successive frames of data corresponding to said scene at a first interval during which said radiant energy is received and a second interval during which said radiant energy is not received by said tracking unit; and means for taking the difference between said successive frames of data to provide said signals indicative of the position of said vehicle relative to said predetermined frame of reference.

2. A control system including a tracking unit for providing electrical signals indicative of the position of a vehicle relative to a predetermined frame of reference within a scene comprising:

a beacon, mounted on said vehicle and operable during predetermined intervals of time to indicate the position of the vehicle relative to the scene;

an infrared sensor and display for providing signals representing a first frame of data corresponding to the scene when the beacon is on and a second successive frame of data corresponding to the scene when the beacon is off; and electrical circuitry for taking the difference between the first and second frames of data to provide said signals indicative of the position of the vehicle relative to said predetermined frame of reference.

* * * * *